United States Patent [19]

Ebbeson

[11] Patent Number: 5,431,716
[45] Date of Patent: Jul. 11, 1995

[54] SORPTION DEVICE

[76] Inventor: Bengt Ebbeson, Horbenstrasse 3, CH-8356 Ettenhausen, Switzerland

[21] Appl. No.: 129,988

[22] Filed: Sep. 30, 1993

[30] Foreign Application Priority Data

Oct. 1, 1992 [DE] Germany .......................... 42 33 062.9

[51] Int. Cl.⁶ .............................................. B01D 53/06
[52] U.S. Cl. ...................................... 96/125; 96/128; 96/130; 96/154
[58] Field of Search ................................. 96/125–128, 96/150, 130, 143–146, 153, 154

[56] References Cited

U.S. PATENT DOCUMENTS

| 2,286,920 | 6/1942 | Miller | 96/125 |
| 2,639,000 | 5/1953 | Edwards | 96/125 |
| 2,662,607 | 12/1953 | Moragne | 96/125 |
| 2,680,492 | 6/1954 | Kopp | 96/125 |
| 3,828,528 | 8/1974 | Weil | 96/150 X |
| 4,012,206 | 3/1977 | Macriss et al. | 96/125 X |
| 4,497,361 | 2/1985 | Hajicek | 96/125 |
| 4,594,860 | 6/1986 | Coellner et al. | 96/125 X |
| 4,700,550 | 10/1987 | Rhodes | 96/128 X |
| 4,711,097 | 12/1987 | Besik | 96/125 X |
| 4,769,053 | 9/1988 | Fischer, Jr. | 96/125 |
| 5,170,633 | 12/1992 | Kaplan | 96/125 X |
| 5,242,473 | 9/1993 | Ogasahara | 96/125 |

FOREIGN PATENT DOCUMENTS 0151237  8/1985  European Pat. Off. .
0794310  1/1981  U.S.S.R. .................. 96/125

Primary Examiner—Robert Spitzer

[57] ABSTRACT

A sorption device for use in a cooling plant consists of a plurality of elongated sorption containers, which along part of their length are filled with sorbents, and in this part constitute a digester adsorber zone, and where the other part of their length constitutes a condensor evaporator zone. The sorption containers rotate in two coaxial housings on a circular path, and with the digester adsorber element (16) they are disposed in the one housing (11), and with the condensor evaporator element (30) in the other housing. The housing (11) enclosing the condensor adsorber elements (16) only has one inlet (13) and one outlet (14) for the gaseous heat transfer medium, so that on its flow path through the housing the heat transfer medium both withdraws heat from the digester adsorber elements (16) and supplies heat thereto. The arrangement ensures a particularly favorable energetic efficiency. When the device is used as air cooling device in air-conditioning systems a drying of the air to be cooled can be effected, utilizing the heat dissipated from the condensor evaporator region.

31 Claims, 5 Drawing Sheets

SORPTION DEVICE

BACKGROUND OF THE INVENTION

The invention relates to a sorption device, in particular for use in a cooling system, an air-conditioning apparatus or the like.

By means of sorption devices heat can be transferred from a first heat carrier to a second heat carrier, which has a higher temperature. In the process, a working fluid is sorbed exothermically in a sorbent, and is desorbed again in an endothermic reaction.

Known sorption devices, which can also be used for cooling plants, have elongated sorption containers, for instance in the form of closed pipes. These pipes have been evacuated and contain a sorbent, e.g. a zeolite, in a portion of a about ⅔ their length. This portion constitutes the digester adsorber element. In the other portion, which is about ⅓ their length and constitutes the condensor evaporator element, there is contained a working fluid such as water. Due to the adsorbing effect of the zeolite, the water will evaporate under a vacuum at a temperature of about $-5$ to $15°$ C., withdrawing heat from the surroundings. The digester adsorber element heats up as a result of the released heat of adsorption.

When upon termination of the reaction, additional heat is supplied to the digester adsorber element, the same releases the adsorbed water in the form of steam, which in the condensor evaporator element again condenses to form water.

By cooling the heated digester adsorber element to near ambient temperature, and by subsequent heating beyond the ambient temperature it is thus possible to withdraw heat from the condensor evaporator element and utilize the same for instance for cooling a stream of air. The reaction takes place periodically. By combining a plurality of sorption containers and by means of a successive, alternating cooling and heating of the digester adsorber elements a quasicontinous operation can be achieved. From European Patent 0 151 237 B1 a sorption device is known, where a plurality of sorption containers are arranged axially parallel on a circular path and rotate about an axis of rotation. The sorption containers are enclosed by two housings, one of which surrounds the digester adsorber elements, and the other surrounds the condensor evaporator elements. The housings are divided in at least two flow segments, through which the sorption containers pass once during each rotation, and in which there always takes place only one heat supply or one dissipation of heat via a heat transfer medium.

With respect to the digester adsorber elements this means that for dissipating the heat of adsorption and for supplying the heat of desorption separate flows of a heat transfer medium are utilized, between which no heat transfer takes place. When for instance air is utilized for supplying and dissipating heat, on the one hand the ambient air is heated and dissipated during the cooling of the digester adsorber elements, and on the other hand the ambient air is heated for instance by a gas burner and then releases its heat for desorption to the digester adsorber elements. The plant therefore has an unfavorable efficiency.

In the condensor evaporator elements the heat released in the condensation phase is dissipated unutilized, whereas part of the heat absorbed in the evaporation phase is dissipated as condensation heat with a high relative humidity of the supplied air, and is therefore likewise not utilized energetically, unless the apparatus is utilized as an air drying apparatus.

It is the object of the invention to develop a sorption device of the above-mentioned type such that the energy to be expended is utilized optimally, and the efficiency is improved.

SUMMARY OF THE INVENTION

This object is solved in accordance with the features of claim 1 in that the housing enclosing the digester adsorber elements of the sorption containers has only one inlet and one outlet for the gaseous heat transfer medium, and that the heat transfer medium on its flow path through the housing both withdraws heat from the sorption containers and also supplies heat thereto. The heat withdrawn from the digester adsorber elements while they were cooled is thus not dissipated unutilized, but constitutes the preheating for the heat supply during the subsequent phase of desorption.

On the other hand, the residual heat contained in the heat transfer medium after the desorption serves to preheat the digester adsorber elements that were cooled down in the phase of adsorption.

Advantageous embodiments of the invention can be taken from the sub-claims. The device in accordance with the invention has a compact design and in conjunction with the inventive drying means also provides for a particularly efficient air-conditioning in humid climatic zones. Furthermore, the device can easily be converted for use as cooling or heating device, so that an efficient air-conditioning in summer or winter operation can be achieved. In addition, with the device in accordance with the invention deeper air-conditioning temperatures can be achieved, as due to the preceding drying of the air to be conditioned a larger part of the cooling capacity is available for cooling purposes.

BRIEF DESCRIPTION OF THE DRAWINGS

Further advantages, features and details of the invention can be taken from the following description of a preferred embodiment with reference to the drawing, wherein:

FIG. 1 schematically shows a perspective view of an inventive sorption device without preceding drying means for the ambient air taken in;

DETAILED DESCRIPTION OF THE PREFERRED EMBODIMENTS

Figure 1:
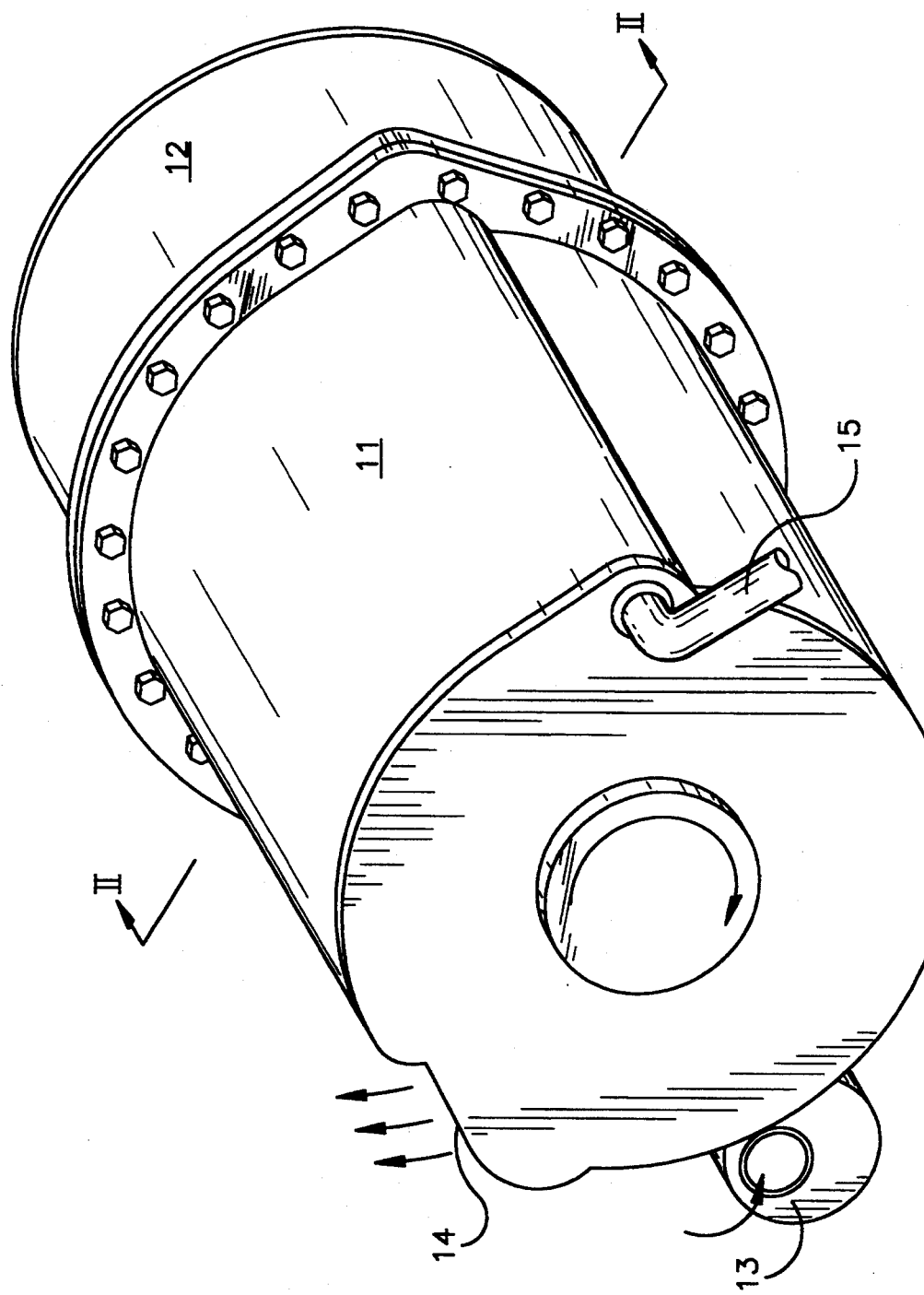

The sorption device in accordance with the invention consists of two coaxially arranged housings 11 and 12 which are connected with each other. The housing 11 surrounds the digester adsorber elements and can comprise ⅓ to ⅔ of the total length of the device, and in the embodiment described here it is about twice as long as the housing 12 surrounding the condensor evaporator elements. The length is optimized corresponding to the used substances.

At the housing 11 an air inlet 13 is provided, into which ambient air is sucked through a radial flow fan and is passed through the housing to an air outlet 14. Radially approximately opposite the fan the housing 11 comprises a gas burner 29 for heating the air. The introduction of the fuel gas is indicated at 15.

The housing 12 can have one central or two air inlets (not shown in FIG. 1). Into the one inlet 32 air is supplied via the passage 37 (FIG. 4, 5) at room temperature and is cooled during the evaporator phase. It leaves the associate outlet 34 and is used as cooling air, for instance for cooling the interior of a motor vehicle. To the other inlet 33 air is likewise supplied at room temperature and is heated in the condensation phase. It leaves the outlet 35 as carrier of the waste heat, and during summer operation it is discharged to the outside, whereas during winter operation of the device it can be used for heating the air in a room.

Figure 2:
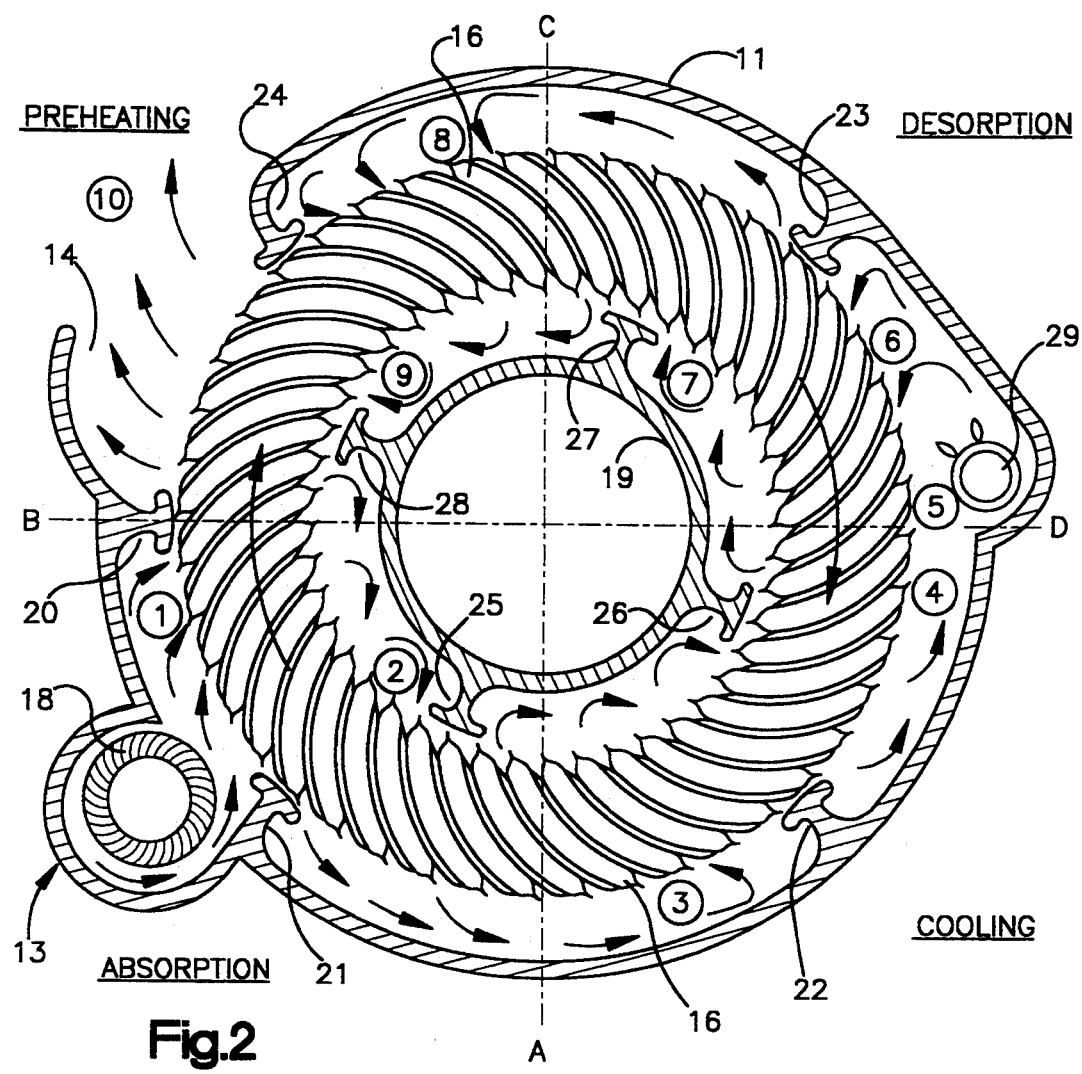
FIG. 2 shows a cross-section through the housing containing the digester adsorber elements, along line II—II of FIG. 1.

FIG. 2 shows a cross-section through the housing 11 with the digester adsorber elements 16 of the sorption container disposed therein. The digester adsorber elements constitute elongated, flat hollow bodies and are bent at right angles to their longitudinal extension. They contain a zeolite, which by means of appropriate measures not represented in detail is distributed and stored such that it has the largest possible surface. The digester adsorber elements can, for instance, be made of stainless steel sheet having a thickness of 0,2 mm, which on its inside is provided with a 2 mm thick layer of zeolite. On the outside, they have small steel sheet ribs, so that they are kept equally spaced in the assembled condition. The passages formed therebetween serve to guide the air.

In another embodiment the hollow bodies extending in longitudinal direction of the housings 11, 12 can be undulating in a direction transverse to their extension, where the maxima of the waves are oriented oppositely to prevent the very thin sheets from folding together under the influence of an external pressure. Instead of the outer ribs 17 there can also be provided sheet metal bulges or the like.

As represented here, the digester adsorber elements are arranged opposite to each other in the form of a circular ring, and they rotate as a whole in clockwise direction at a speed in the order of one rotation in 3 minutes. As can be seen from FIG. 3, the digester adsorber elements having more or less a wing profile are spaced from each other through the ribs 17, which are disposed on their upper side and their lower side offset from each other, and between themselves constitute radial flow passages. The zeolite layer 49 can have reinforcements formed by small sheet metal strips, through which it is avoided that the thin sheet metal sections are bent under the influence of different pressures, and which serve to improve the heat transfer.

Figure 4:
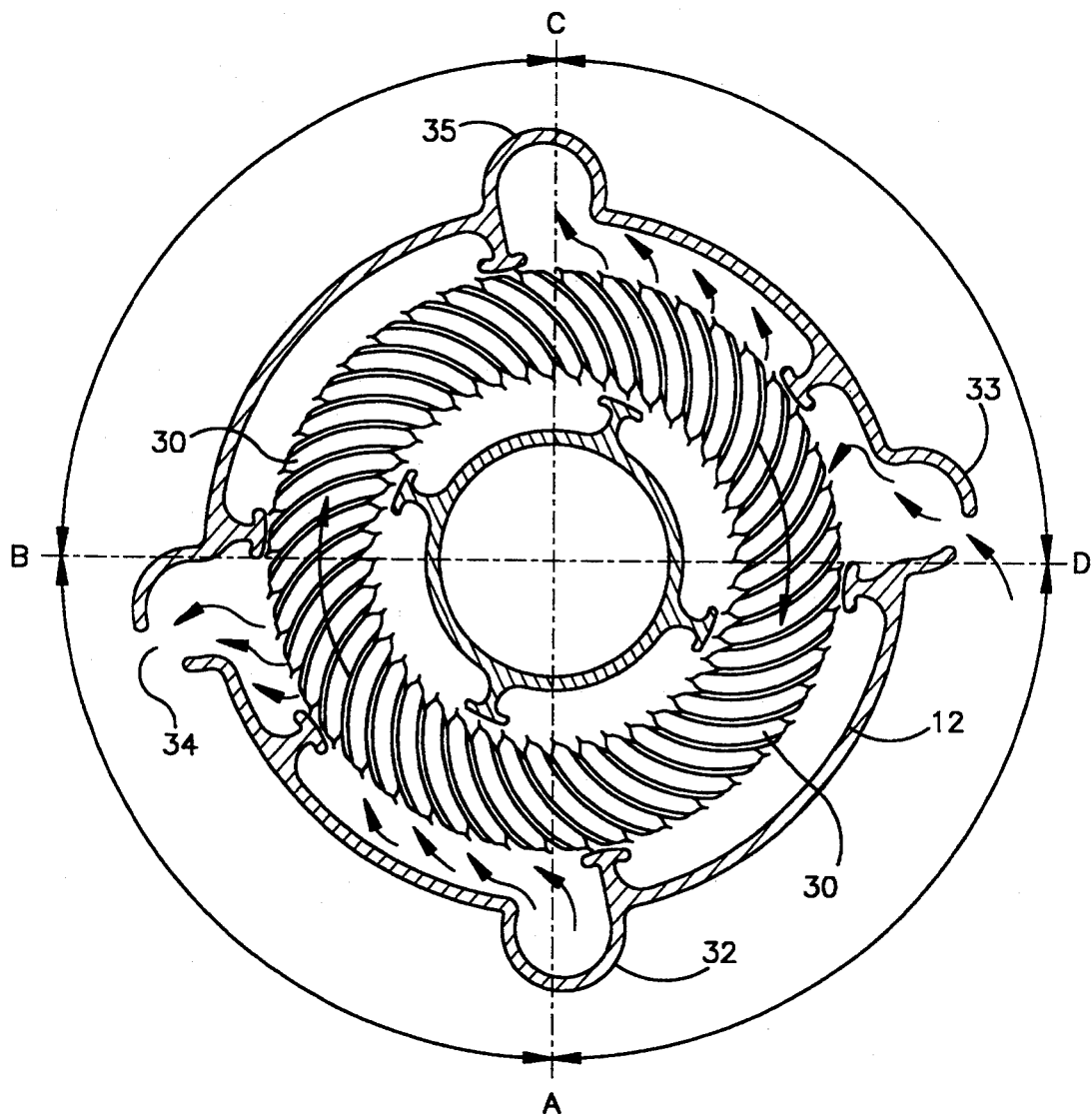
FIG. 4 shows a cross-section through the housing containing the condensor evaporator elements, along line IV—IV of FIG. 5 in a smaller scale.

During one rotation the digester adsorber elements 16 pass through four regions, whose transitions are referred to as A, B, C and D in FIG. 2 and 4. In this connection it should be emphasized that these are floating transitions, and the regions need not have the same size, but can deviate from the represented 90° sectioning.

The region A-B is the region of adsorption. Here, the zeolite adsorbs the steam by releasing heat, where the heat is released to the sections and is absorbed by the air introduced through the inlet 13. The steam is generated in the condensor evaporator elements and withdraws heat from the inflowing air in the housing 12.

The region B-C is the heating region, in which residual heat from the desorption region C-D is supplied to the sections.

The region C-D is the region of desorption. Here, digester adsorber elements are heated beyond the previous heating to about 300° C., in order to drive out the adsorbed water. The water condenses in the condensor evaporator elements 30 (FIG. 4, 6, 8) by releasing the condensation heat to the second stream of air supplied via the inlet 33 in the housing 12.

The region D-A, finally, is the cooling region. Here, the digester adsorber elements 16 heated for desorption are cooled to be able to again adsorb water in the adjoining region A-B.

The supply and dissipation of heat at the outer surfaces of the condensor adsorber elements 16 is effected by a stream of air, which enters the housing 11 through the air inlet 13 and is passed on through a radial flow fan 18. The main flow direction of the air is counter-clockwise. The outer wall of the housing 11 and a cylindrical inner wall 19 are spaced from the longitudinal sides of the digester adsorber elements, which are for instance sealed by roll welds, so that there are formed flow passages for the air, which extend in peripheral direction. At the outer wall inwardly facing, longitudinally extending webs 20, 21, 22, 23, 24 are formed, at which the stream of air is deflected radially to the inside. The cylindrical inner wall 19 carries corresponding webs 25, 26, 27, 28 pointing to the outside, which are offset from the webs 20 to 24 in peripheral direction and guide the stream of air radially to the outside.

In the vicinity of the transition D there is provided the burner 29, in particular a gas burner, which substantially extends along the length of the housing 11.

This burner can also be disposed adjacent the inner wall 19.

The stream of air supplied through the fan 18 follows the path indicated by arrows. In the region A-B it enters the housing and is guided by the webs 20, 21, for instance at (1), radially to the inside, and by the web 25, for instance at (2), again radially to the outside. In doing so it adsorbes the heat of adsorption produced in the digester adsorber elements 16.

At the transition A the air gets in contact with the digester adsorber elements, which have been heated in the desorption region C-D. By the web 22 the air is guided to the inside, at (3), and by the web 25 it is passed on counter-clockwise in peripheral direction. In doing so it absorbs further heat, while the heated digester adsorber elements are cooled down.

At the web 26 the stream of air is again deflected to the outside, so that at (4) the air again gets into the outer flow passage. At (5) it is heated by the gas burner 29 and thus reaches a higher heat level than the digester adsorber elements 16. In practice, the air temperature in this region is in the order of 300° C. or higher.

At (6) the hot air is guided to the inside by the web 23, and at (7) it is again guided to the outside by the web 27 and dissipates its heat to the digester adsorber elements, in which therefore takes place the above described desorption.

At (8) the air is deflected to the inside, and at (9) again to the outside to be finally discharged at (10). With this flow occurring in region C-B the air dissipates its residual heat to the digester adsorber elements 16, which come from the adsorption region A-B in a cooled condition and are thus preheated for desorption.

At the outlet 14 the air only has a slightly higher temperature than at the inlet 13, so that in the vicinity of the digester adsorber elements 16 there is only a minor loss of heat and thus of energy.

FIG. 4 shows a section through the housing 12 in a slightly reduced scale, in which there are disposed the condensor evaporator elements 30. Together with the digester adsorber elements 16 these hollow bodies each constitute a component extending in longitudinal direction of the housings 11, 12. At the transition from the housing 11 to the housing 12 the digester adsorber elements 16 are separated from the condensor evaporator elements 30 by an insulating wall designated with the reference numeral 31 in FIG. 6, by means of which the passage of the heat transfer medium is prevented in both directions. The digester adsorber elements 16 and the condensor evaporator elements 30 are thus rotating with each other about the same axis and are additionally fixed by the insulating wall 31.

As has already been mentioned, the housing 12 comprises one or two air inlets 32, 33, which are not shown in FIG. 1. In the embodiment shown in FIG. 4 there are two air inlets 32, 33 and two air outlets 34, 35. To the air inlet 32 ambient air is supplied, which flows around the condensor evaporator elements 30 as indicated by the arrows and is discharged through the air outlet 34 as conditioned air. In the same way, air at ambient temperature flows into the air inlet 33 and leaves the housing 12 through the air outlet 35 via the passage 38.

As can be seen, the inlet 32 and the outlet 34 are located in the area A-B, which in the housing 11 constitutes the region of adsorption. In the housing 12 this region is the evaporator region, in which the liquid contained in the condensor evaporator elements 30 evaporates under a vacuum, absorbing heat from the ambient air. In the case of water, the boiling temperature is for instance in the range of about $-5°$ to $+15°$ C. The heat is withdrawn from the air flowing around the condensor evaporator elements 30, which thus leaves the air outlet 34 at a lower temperature and can be used as conditioned air, for instance in a motor vehicle.

The inlet 33 and the outlet 35 cover a region which in direction of rotation of the condensor evaporator elements 30 approximately lies in the region C-D, in which in the housing 11 the desorption is effected by means of heating. The steam driven out of the digester adsorber elements 16 condenses by releasing heat in the housing 12 in the condensor evaporator elements 30. The released heat is dissipated to the surrounding air, which therefore leaves the air outlet 35 at a higher temperature than when it is supplied through the air inlet 33. For optimizing the air-conditioning it may be necessary to shift the inlets and/or outlets in peripheral direction in dependence on the chosen substances. In summer operation the stream of air discharged at 34 serves to produce conditioned air, and at 35 the stream of air introduced at 33 is guided to the outside via the passage 38.

In winter operation, the stream of air 33-35 is used as hot air via a flap 43 for air-conditioning, whereas the stream of air 32-34 is discharged to the outside.

Depending on the application, the air supply can constructively also be designed such that the ambient air is supplied through a common fan in a passage in which the air is divided for the two inlets 32 and 33.

One possible field of application of the sorption device in accordance with the invention is the cooling of the air in a room in air-conditioning systems. When such systems are operated in regions with a high air humidity, as is for instance the case in some regions of the USA, there is the effect that the steam contained in the air condenses at the cooling surfaces and must be discharged as water. This effect is undesirable, because the entire heat of condensation is transferred to the cooling unit, which therefore must have an increased cooling capacity, which is not converted into a cooling of the air. The efficiency of the system is therefore distinctly deteriorated.

In one embodiment of the inventive sorption device the condensation of the air humidity can be avoided, and the efficiency can thus be improved and can be maintained even with a high air humidity. This embodiment is illustrated in FIGS. 5 to 7.

The principle of this embodiment consists in the fact that the heat released in the condensor evaporator region, which has been discharged through the air outlet 35, is utilized for drying the ambient air to be cooled, which has been taken in. For drying air in a room devices are known which have a disk- or ring-shaped rotor rotating at a low speed, through which axially flows air to be dried. The flow passages of the rotor are coated with a hygroscopic salt that absorbs the air humidity. To this end lithium chloride can be used, for instance, which can possibly be provided on a support of zeolite. In one rotation the rotor passes through two regions. In the first region, the humid ambient air flows therethrough, thereby releasing its humidity to the salt. Through the second region there flows heated air, which has a lower relative humidity and again withdraws the humidity from the salt.

Figure 5:
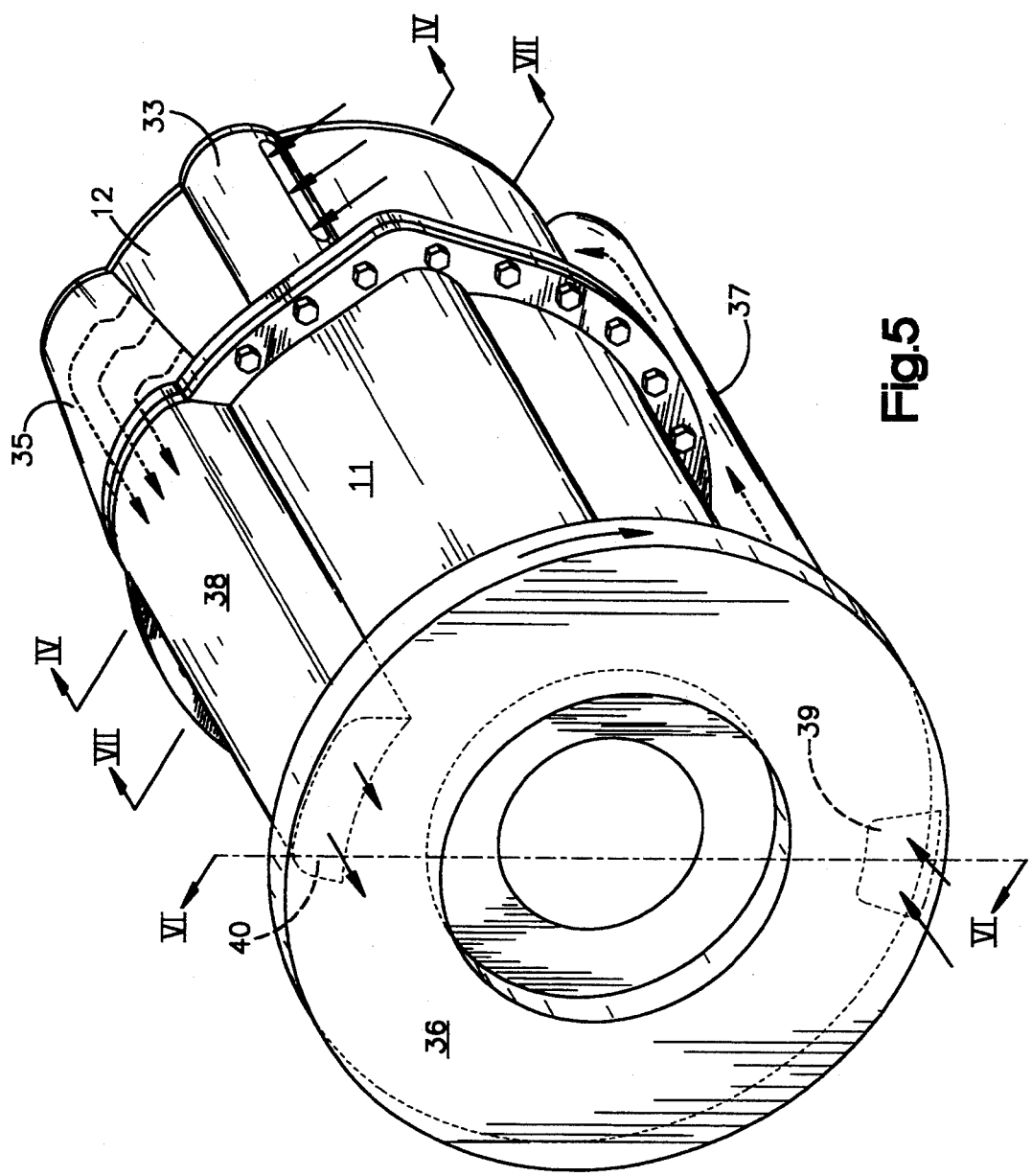
FIG. 5 schematically shows a perspective view of an inventive sorption device with an additionally attached means for drying the supplied air.
Figure 6:
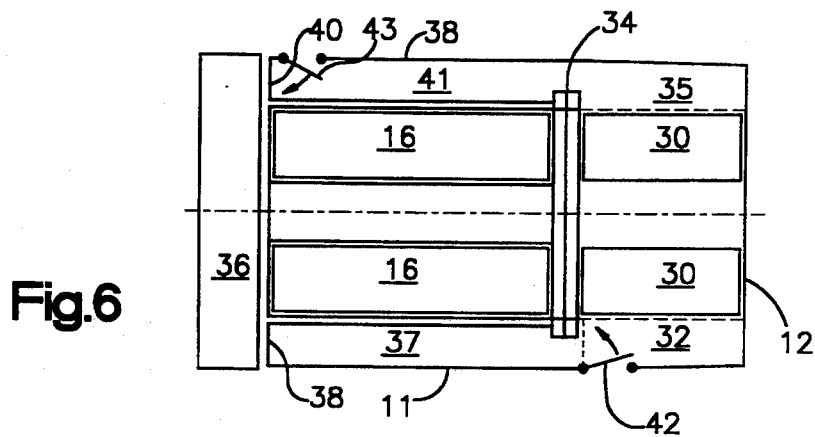
FIG. 6 shows a section along line VI—VI of FIG. 5.

In accordance with FIG. 5 and 6 such a rotor 36 is mounted before the housing 11 comprising the digester adsorber elements 16. It is arranged coaxially with the digester adsorber elements 16 and the condensor evaporator elements 30 and rotates with the same speed as them, for instance with one rotation in the order of 3 minutes. The air inlet 32 and the air outlet 35 of the housing 12 are connected by passages 37, 38 having openings 39, 40, which are disposed on one side of the rotor 36.

Figure 7:
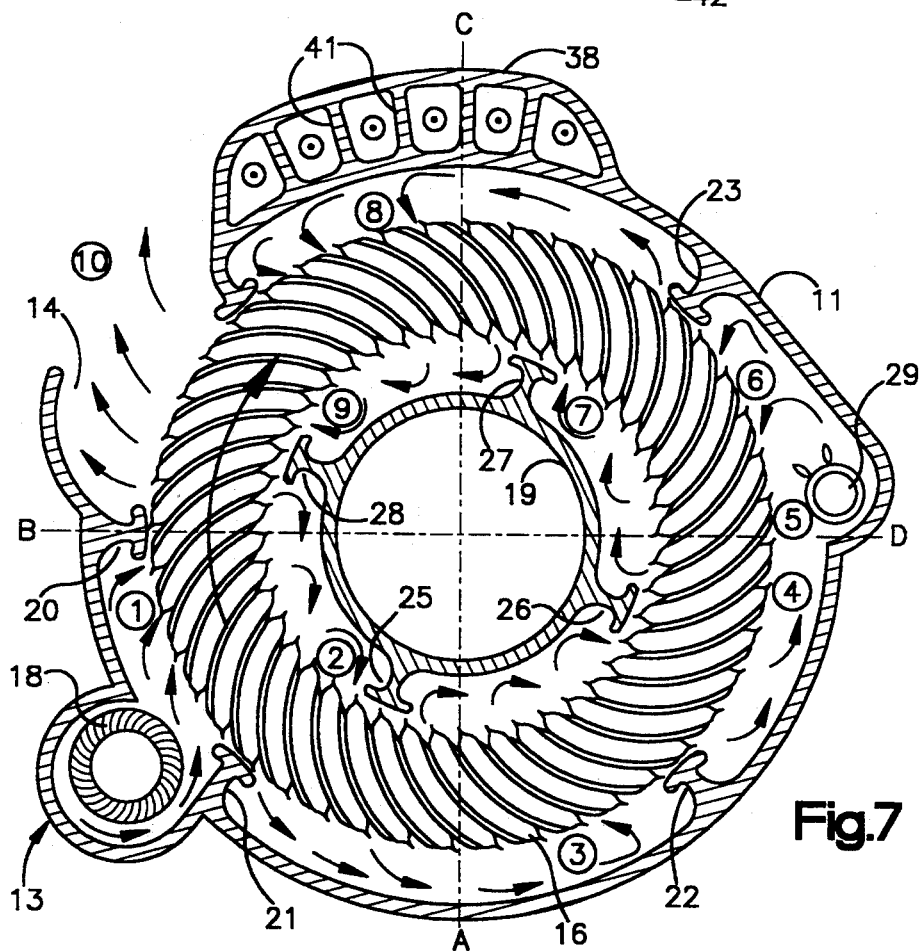
FIG. 7 shows a cross-section through the housing containing the digester adsorber elements in the embodiment in accordance with FIG. 5, along line VII—VII.

As is particularly shown in FIG. 7, the passage 38 extends on the housing 11 in the region C, in which the desorption of the digester adsorber elements 16 is started by means of heating. The air heated by the burner 29 flows through this region. A part of the heat contained in this air is dissipated through the wall of the housing 11 and via ribs 41 provided in the passage 38 to the air flowing through the passage 38. When leaving the opening 40, the air is therefore distinctly heated and withdraws the humidity from the salt of the rotor 36 by dissipating heat.

The heat of the air leaving through the outlet 35, which otherwise would be dissipated to the outside unutilized, is in this way also utilized, and even the heat produced in the digester adsorber region by the burner is better utilized. The power loss occurring during a condensation of the air humidity can thus be avoided without a considerably increased expenditure of energy.

At 42 and 43 in FIG. 6 flaps are indicated, which serve to close the passages 37 and 38 and at the same time open the inlet 32 and the outlet 35 to the outside via the passage 38. To achieve the air flow of the cooled air, a fan can be provided within the device in the vicinity of the inlet 32. To achieve the flow of the hot air, a fan can be provided in the vicinity of the inlet 33. The flaps can for instance be controlled automatically, such as hygrostatically or thermally or mechanically by hand, and they allow the drying of air to be effected only with a correspondingly high relative humidity, so as to avoid an unnecessary actuation and heating of the salt rotor.

Figure 8:
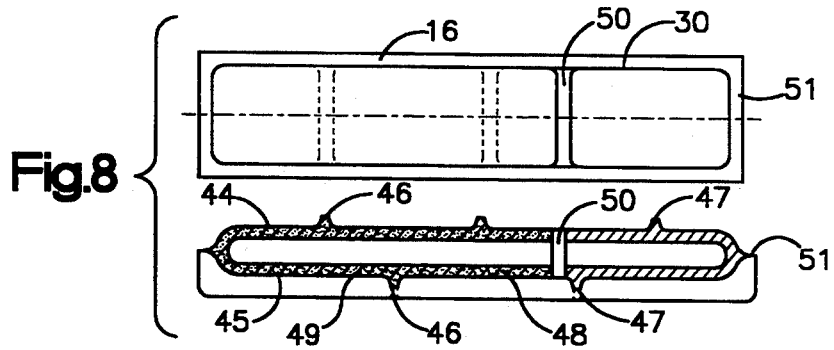
FIG. 8 shows the structure of a sorption container.

FIG. 8 schematically shows the structure of a sorption container consisting of digester adsorber element 16 and condensor evaporator element 30. The sorption container consists of two deep-drawn thin sheets 44, 45 having a wall thickness of 0,2 mm or less. In the upper sheet 44 in the drawing, when viewed from the inside, recesses 46, 47 have been formed. The sheets are coated at their inside with a supporting material 48, for instance with glass fiber. The digester adsorber element is separated from the condensor evaporator element by a charging gap 50. The zeolite material 49 is incorporated in the supporting material 48.

Figure 3:
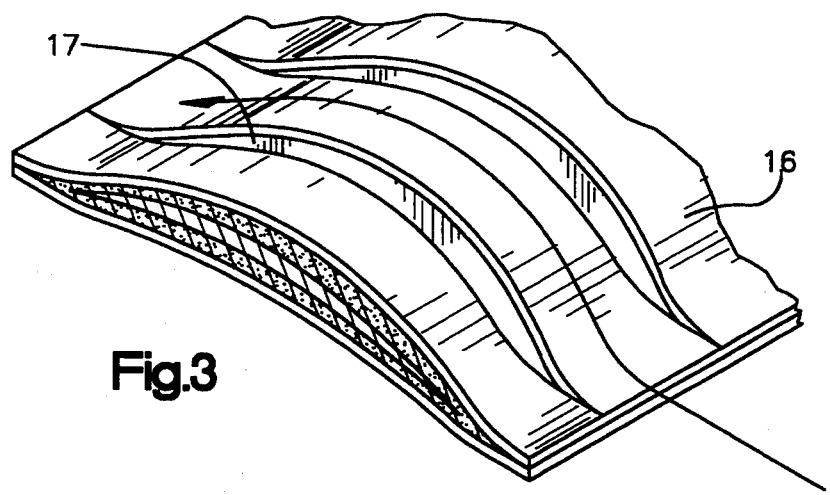
FIG. 3 shows a partial cross-section through the digester adsorber element of a sorption container.

During manufacture, the two sheets 44, 45 were manufactured separately, then placed side by side in the illustrated flat condition and welded together at the peripheral edges by means of a rolling seam 51. The curvature in the form of an involute, which is shown in FIG. 3 and promotes the air flow, can be made during the step of combining and connecting because of the low wall thicknesses.

A possible field of application of the inventive sorption device is the cooling of the passenger compartment of motor vehicles. For heating the air a heat exchanger can be provided instead of the gas burner 29, which in the sorption device appropriately utilizes the heat contained in the exhaust gases. The exhaust gases can be directly introduced in section C-D.

A further field of application are air-conditioning devices in camping cars and mobile homes, where the devices can be accommodated in the roof. The heating of the digester adsorber element can selectively be effected with gas or with current.

With a corresponding design, the sorption device in accordance with the invention can finally also be operated as a heat pump and be used both for heating and for cooling.

A major advantage of the device in accordance with the invention consists in the fact that the airflow is repeatedly guided through the flow passages from the outside to the inside and vice versa, where in the digester adsorber region an improved utilization of heat, and in the condensor evaporator region an intensive heat transfer are effected. The heat to be supplied to the digester adsorber region can therefore be reduced, so that the energy requirement is reduced. The advantageous construction of the digester adsorber elements provides for an improved heat distribution along the length and the cross-section, and thus for an improved efficiency.

What is claimed is:

1. A sorption device for use in a cooling system, said sorption device comprising a plurality of elongated sorption containers each having along a part of its length a digester adsorber element containing sorbents and, along another part of its length, a condenser evaporator element, coaxial first and second housings (11,12) in which the sorption containers are arranged with the digester adsorber elements disposed in the first housing (11) and the condenser evaporator elements disposed in the second housing (12), means for axially rotating said sorption containers on a circular path, means for supplying a gaseous heat transfer medium to outer surfaces of the sorption containers in each of the housings, and means (29) for heating the gaseous heat transfer medium in the first housing (11), wherein said first housing (11) has only one inlet (13) and one outlet (14) for the gaseous heat transfer medium and said heat transfer medium, on its flow path through the first housing, both withdraws heat from the digester adsorber elements (16) and supplies heat thereto.

2. The sorption device as claimed in claim 1, further comprising guides for directing the heat transfer medium through the first housing (11) in a direction opposite the direction of rotation of the sorption containers and alternately radially outward and radially inward over the digester adsorber elements (16).

3. The sorption device as claimed in claim 2, wherein said guides comprise axially extending and peripherally spaced webs (20 to 28) provided in the first housing, said webs radially extending to outer and inner edges of a ring-shaped circular path of the sorption containers.

4. The sorption device as claimed in claim 1, wherein said means (29) for heating the heat transfer medium is disposed in about the middle of the flow path of the heat transfer medium through the first housing.

5. The sorption device as claimed in claim 1, wherein said second housing (12) enclosing the condenser evaporator elements (30) has an inlet (32—summer operation, and 33—winter operation, respectively) and an outlet (34—summer operation, and 35—winter operation, respectively) for air to be conditioned, and an inlet (33—summer operation, and 32—winter operation, respectively) and an outlet (35—summer operation, and 34—winter operation, respectively) for a gaseous process medium.

6. The sorption device as claimed in claim 1, wherein said heat transfer medium on its flow path from the inlet (13) to the outlet (14) flows through reaction regions of the sorption containers comprising:
   a region of adsorption in which heat released during adsorption is transferred to the heat transfer medium;
   a cooling region in which the digester adsorber elements (16) dissipate heat to the heat transfer medium;
   a region of desorption in which the heat transfer medium is heated by the heating means (29) and dissipates heat to the digester adsorber elements (16) to drive out liquid contained in the sorbent and transfer the liquid from the digester adsorber elements to the condenser evaporator elements of the sorption containers; and
   a preheating region in which the digester adsorber elements (16) are preheated for subsequent desorption.

7. The sorption device as claimed in claim 6, wherein said second housing has two inlets (32, 33) for the air to be conditioned that are connected with a common air supply.

8. The sorption device as claimed in claim 7, wherein said second housing has fans provided in the vicinity of the inlets (32, 33) for the air to be conditioned.

9. The sorption device as claimed in claim 1, wherein said first housing (11) has a fan (18) provided at the inlet for the heat transfer medium.

10. The sorption device as claimed in claim 9, wherein said fan (18) is a radial flow fan.

11. The sorption device as claimed in claim 1, wherein said means for heating the heat transfer medium is a burner (29).

12. The sorption device as claimed in claim 1, wherein said means for heating the heat transfer medium is a heat exchanger.

13. The sorption device as claimed in claim 1, wherein said sorption containers constitute elongated flat hollow bodies.

14. The sorption device as claimed in claim 13, wherein said sorption containers are curved in cross-section.

15. The sorption device as claimed in claim 13, wherein said sorption containers are provided with ribs (17, 46, 47) extending on their outer surfaces transverse to their longitudinal extension to keep the outer surfaces of adjacent sorption containers spaced apart a distance and form flow passages for the heat transfer medium.

16. The sorption device as claimed in claim 15, wherein said sorption containers are coated on an inside surface with a supporting material (48).

17. The sorption device as claimed in claim 16, wherein said sorbents contained in the digester adsorber elements (16) of the sorption containers comprise a zeolite incorporated in the supporting material (48).

18. The sorption device as claimed in any one of claims 1 to 16, wherein said sorbents contained in the digester adsorber elements (16) of the sorption containers comprise a zeolite and water.

19. The sorption device as claimed in claim 18, wherein said zeolite (49) is laminated onto an inside surface of the digester adsorber elements (16) and is stiffened by reinforcements so that the digester adsorber elements (16) can withstand different pressures.

20. The sorption device as claimed in any one of claims 1 to 16, wherein said sorbents contained in the digester adsorber elements (16) of the sorption containers comprise liquid ammonia and a salt.

21. The sorption device as claimed in any one of claims 1 to 16, wherein said sorbents contained in the digester adsorber elements (16) of the sorption containers comprise liquid ammonia and an activated carbon.

22. The sorption device as claimed in any one of claims 1 to 8, wherein said second housing has an air inlet for air to be cooled by the condenser evaporator elements, said sorption device further comprising means for drying air entering said air inlet.

23. The sorption device as claimed in claim 22, wherein said drying means comprises a rotor (36) provided with a hygroscopic salt and through which axially flows the air to be dried.

24. The sorption device as claimed in claim 23, wherein said rotor (36) rotates synchronously with the sorption containers.

25. The sorption device as claimed in claim 23, wherein said second housing has an air outlet (35) for air heated by the condenser evaporator elements (30) and connected with the rotor (36) to withdraw adsorbed humidity from the salt.

26. The sorption device as claimed in claim 25, wherein said air outlet (35) is connected to the rotor (36) with a passage in heat conducting communication with the first housing enclosing the digester adsorber elements (16) in a region (C) where initial heating of the digester adsorber elements (16) takes place.

27. The sorption device as claimed in claim 26, wherein said passage (38) has heat conducting ribs (41) arranged in a flow direction.

28. The sorption device as claimed in claim 25, wherein said air inlet (32) for the air to be cooled and the air outlet (35) for the heated air are provided with means for selectively connecting the air inlet (32) and the air outlet (35) with the drying means or with ambient air.

29. The sorption device as claimed in claim 28, wherein said connecting means comprises hygrostatically controlled flaps (42, 43).

30. The sorption device as claimed in claim 28, wherein said connecting means comprises thermally controlled flaps (42, 43).

31. The sorption device as claimed in claim 28, wherein said connecting means comprises mechanically controlled flaps (42, 43).

* * * * *

UNITED STATES PATENT AND TRADEMARK OFFICE
CERTIFICATE OF CORRECTION

PATENT NO.   : 5,431,716
DATED        : July 11, 1995
INVENTOR(S)  : Bengt Ebbeson It is certified that error appears in the above-identified patent and that said Letters Patent is hereby corrected as shown below:

On title page, item [73]  the following should
be inserted with respect to the assignee:  --Electrolux Leisure Appliances AG. Frauenfeld, Switzerland--.

On title page, the following should
be inserted with respect to the Attorney, Agent or Firm: --Pearne, Gordon, McCoy & Granger--.

Column 1, line 41, after "achieved.", start new paragraph with --From European Patent...--.

Signed and Sealed this

Twenty-third Day of April, 1996

Attest:

BRUCE LEHMAN

*Attesting Officer*   Commissioner of Patents and Trademarks